United States Patent
Iwata et al.

(10) Patent No.: US 8,633,282 B2
(45) Date of Patent: Jan. 21, 2014

(54) METAL REMOVING AGENT AND METAL REMOVING FILTER

(75) Inventors: Asaki Iwata, Ichinomiya (JP); Hiroki Kuriyama, Nagoya (JP); Shozo Ikejima, Okazaki (JP); Minoru Funahashi, Kariya (JP)

(73) Assignee: Denso Corporation, Kariya (JP)

( * ) Notice: Subject to any disclaimer, the term of this patent is extended or adjusted under 35 U.S.C. 154(b) by 293 days.

(21) Appl. No.: 12/964,932

(22) Filed: Dec. 10, 2010

(65) Prior Publication Data

US 2011/0139702 A1     Jun. 16, 2011

(30) Foreign Application Priority Data

Dec. 10, 2009   (JP) ................................ 2009-280841

(51) Int. Cl.
   *C08F 228/00*   (2006.01)
   *B32B 5/16*     (2006.01)
   *B01D 24/04*    (2006.01)
   *B01D 24/14*    (2006.01)

(52) U.S. Cl.
   USPC .................... 525/333.5; 525/332.2; 428/402; 210/289; 210/295

(58) Field of Classification Search
   USPC ............ 525/332.2, 333.5; 428/402; 210/289, 210/295
   See application file for complete search history.

(56) References Cited

U.S. PATENT DOCUMENTS

| 2004/0069704 | A1 | 4/2004 | Yamaguchi et al. |
| 2008/0164215 | A1* | 7/2008 | Tavlarides et al. ............ 210/688 |

FOREIGN PATENT DOCUMENTS

| JP | 62096678 A * | 5/1987 |
| JP | S62-096678 | 5/1987 |
| JP | UM 3-059012 | 6/1991 |
| JP | 9-228914 | 9/1997 |
| JP | 2004-122100 | 4/2004 |
| JP | 2006-105092 | 4/2006 |
| JP | 2006-175315 | 7/2006 |
| JP | 2006175315 A * | 7/2006 |
| JP | 2009-052562 | 3/2009 |
| WO | WO 2009/082366 | 7/2009 |
| WO | WO 2009082366 A1 * | 7/2009 |

OTHER PUBLICATIONS

Japanese Office Action dated Nov. 22, 2011, issued in counterpart Japanese Application No. 2009-280841 with English Translation.

* cited by examiner

*Primary Examiner* — Michael M Bernshteyn
(74) *Attorney, Agent, or Firm* — Nixon & Vanderhye P.C.

(57) ABSTRACT

A metal removing agent has a capability of removing metal clusters and metal ions from fuel with high efficiency. The metal removing agent is made of resin having anionic functional group of a functional group density within a range of 2 to 25 mmol/ml. The anionic functional group contained in the metal removing agent is at least one selected from sulfonate group, carboxyl group, sulfate group, thiol group, phosphate group, phosphonate group, iminodiacetic acid group, and aminophosphate group. A metal removing filter has a container and the metal removing agent. The container accommodates the metal removing agent.

2 Claims, 1 Drawing Sheet

METAL REMOVING AGENT AND METAL REMOVING FILTER

CROSS-REFERENCE TO RELATED APPLICATION

This application is related to and claims priority from Japanese Patent Application No. 2009-280841 filed on Dec. 10, 2009, the contents of which are hereby incorporated by reference.

BACKGROUND OF THE INVENTION

1. Field of the Invention

The present invention relates to a metal removing agent capable of removing metal clusters contained in fuel, and a metal removing filter having the metal removing agent therein capable of capturing metal clusters contained in fuel and removing the captured metal clusters from fuel with high efficiency.

2. Description of the Related Art

There is a fuel feed system for supplying fuel to an internal combustion engine. In general, the fuel feed system is comprised of a fuel tank and injectors. The fuel tank stores fuel such as diesel gasoline. Each of injectors injects the fuel supplied from the fuel tank into the cylinders of the internal combustion engine. Conventional techniques, for example, as disclosed in Japanese patent laid open publication No. JP 2006-105092 and Japanese patent laid open publication No. JP 2009-052562 have disclosed such a fuel feed system.

In general, each of injectors is composed mainly of a nozzle body and a needle. The nozzle body has an injection hole through which high pressure fuel is injected into a corresponding cylinder of the internal combustion engine. The injection hole is opened and closed by the needle when the needle moves upward and downward in the nozzle body. In more detail, such a type of the injector is further composed of a sliding unit of a cylinder shape, an inserting unit of a small cylindrical shape, and a pressure receiving unit. The sliding unit is moved in the nozzle body. The inserting unit of a small cylindrical shape is smaller in size than the sliding unit. The pressure receiving unit connects the inserting unit and the sliding unit together.

The nozzle body has a guide unit and a fuel accumulation chamber. The guide unit slidably supports the inserting unit. The fuel accumulation chamber is formed at the fuel injection side of the guide unit and temporarily accumulates fuel. The fuel accumulation chamber communicates with the inserting unit.

A high pressure fuel is supplied to the fuel accumulation chamber in order to inject the high pressure fuel into the corresponding cylinder of the internal combustion engine. The high pressure fuel is leaked through a gap between the sliding unit and the guide unit.

By the way, fuel for diesel engines generally contains a trace of metal components. Following Table 1 shows average amount of metal contained in the fuel used in forty-nine countries in the world.

TABLE 1

| | Metal | | | | | | | | |
|---|---|---|---|---|---|---|---|---|---|
| | Na | K | Cu | Fe | Mn | Ni | Zn | Ca | Total |
| Average content (ppm) | 0.014 | 0.016 | 0.033 | 0.017 | 0.007 | 0.0004 | 0.059 | 0.043 | 0.19 |
| Ionization rate (%)*) | 28.1 | Unknown | 23.1 | 11.2 | Unknown | Unknown | 21.4 | 2.1 | — |

*)Ionization rate (%): Percentage of Ion in average content (ppm)

Metal components such as Na and Zn contained in fuel are deposited and accumulated in the gap between the sliding unit and the guide unit in the injector having the structure described above. The accumulated metal components prevent the sliding unit in the injector from moving smoothly.

In order to avoid the above drawback, the conventional documents have proposed various improved techniques. For example, Japanese utility model laid open publication No. H03-59012 discloses a filter having chelating resin, and Japanese patent laid open publication No. JP 2006-105092 and Japanese patent laid open publication No. JP 2009-052562 have disclosed the fuel supply system equipped with a metal ion exchange means.

However, it is difficult for the conventional techniques to adequately prevent metal components contained in fuel from being deposited on and accumulated in the gap between the sliding nit and the guide unit of the injector.

SUMMARY OF THE INVENTION

A person having a skilled in the art has known that fuel generally contains metal powder having a particle size of not less than 100 nm and metal ions. The inventors according to the present invention studied metal components contained in fuel and detected that fuel contains metal clusters having a particle size of several nm in addition to metal powder having a particle size of not less than 100 nm and metal ions. The presence of such metal clusters having a high chemical reactivity would cause the deposition of metal components in the injectors of an internal combustion engine. The conventional techniques can remove metal ions and metal powder, but cannot remove such metal clusters contained in fuel.

It is an object of the present invention to provide a metal removing agent capable of removing metal clusters contained in fuel, and a metal removing filter capable having the metal removing agent capable of suppressing metal clusters from being deposited and accumulated in each of injectors in an internal combustion engine with high efficiency.

To achieve the above purposes, the present invention provides a metal removing agent which captures metal clusters contained in fuel, and removes the metal clusters from the fuel, wherein the metal removing agent is made of resin having anionic functional group of a functional group density (or concentration) within a range of 2 to 25 mmol/ml.

The metal removing agent according to the present invention is made of resin having an anionic functional group of a predetermined functional group density which is within a range of 2 to 25 mmol/ml. The metal removing agent having the above structure can efficiently and adequately remove metal clusters having a highly chemical-reactive property from fuel. Thus, the metal removing agent according to the present invention can remove metal clusters from fuel, and suppress metal components from being deposited to a gap between a sliding unit and a guide unit in each of the injectors of an internal combustion engine.

In accordance with another aspect of the present invention, there is provided a metal removing filter composed of a container and the metal removing agent previously described. The metal removing agent is placed in the container of the metal removing filter.

It is thereby possible for the metal removing filter to adequately remove metal clusters having a highly chemical-reactive property from fuel. This can prevent metal components contained in the fuel from being deposited to the inside of each of the injectors of an internal combustion engine, that is, from being deposited to the gap between the sliding unit and the guide unit in each of the injectors of an internal combustion engine.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
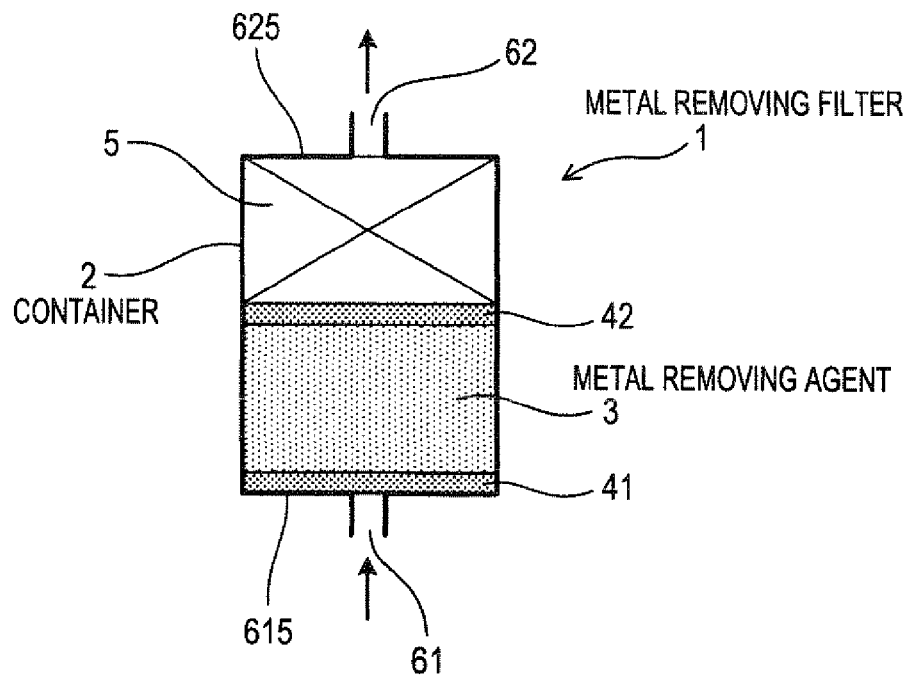
FIG. 1 is a view showing a structure of a metal removing filter according to a second embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of metal removing agent according to a first embodiment of the present invention.

The first embodiment shows the method of producing various types of metal removing agents as evaluation samples E1 to E6 and comparison samples C1 and C2, and also shows the evaluation results of these samples as metal removing agents.

The metal removing agents (as evaluation samples E1 to E14) according to the first embodiment were made of resin containing anionic functional group of a functional group density (or concentration) within a range of 2 to 25 mmol/ml.

The first embodiment prepared the various types of the evaluation samples E1 to e14 and comparison samples C1 to C6 as metal removing agents.

At first, the evaluation sample E1 which contains sulfonate group as anionic functional group was produced by the method described below.

Fuming sulfuric acid (or olem) of 30 wt. % concentration (weight percentage concentration, manufactured by Wako Pure Chemical Industries, Ltd.) and dichloromethane were mixed together to produce one liter of a mixture of fuming sulfuric acid of 1.6 wt. % concentration.

Next, polystyrene-divinyl benzene) (100~200 meshes, manufactured by Wako Pure Chemical Industries, Ltd.) is added into the resultant mixture. The resultant mixture was mixed over one hour (reaction time period) at room temperature in order to perform sulfonation reaction.

Next, solvent was removed from the resultant mixture. The resultant mixture was washed three times by 100 ml of pure water, and was dried at room temperature under low pressure. This produced a metal removing agent made of the sulfonated products of polystyrene-divinyl benzene). This product is the evaluation sample E1.

The functional group density of anionic functional group (sulfonate group) contained in the evaluation sample E1 was detected.

Specifically, the evaluation sample E1 was dispersed into water. Neutralization titration was performed by using sodium hydroxide solution in order to detect a functional group density of the evaluation sample E1 as ion exchange equivalent.

An average particle size of the evaluation sample E1 was also detected by using particle size distribution measuring instruments.

Table 3 shows the time period of the sulfonation reaction in the production of the evaluation sample E1, the functional group density and the average particle size of the evaluation sample E1.

The first embodiment also produced other evaluation samples E2, E3, E4, E5, and E6 and other comparison samples C1 and C2, which had seven types of metal removing agents made of sulfonated products of poly(styrene-divinyl benzene) having different functional group densities. Those evaluation samples E2 to E6, and comparison samples C1 and C2 were produced by changing its reaction time period.

The first embodiment detected the time period of sulfonation reaction, the functional group density, and the average particle size of each of the evaluation samples E1 to E6, and comparison samples C1 and C2. The detection results of those samples will be shown in Table 3.

Next, the first embodiment produced the evaluation samples E7 and E8 and comparison samples C3 as the metal removing agents by the following method. These metal removing agents contain sulfate group.

First, a first solution and a second solution were prepared. In the first solution, 45.0 g of pyridine was solved in 120 ml of dichloroethane. In the second solution, 33.0 g of chlorosulfonic acid was solved in 80 ml of dichloroethane.

Next, the second solution gradually dropped into the first solution at the temperature of 0° C., and the mixture solution of the first solution and the second solution was mixed together over one hour.

Next, 5 g of polyvinyl alcohol (manufactured by Wako Pure Chemical Industries, Ltd.) was added into the resultant mixture solution, and then mixed over four hours (reaction time period) at 60° C.

Next, solvent was removed from the mixture solution, and washed two times, by using 100 ml of ether and then 100 ml of pure water, respectively. The mixture solution was then dried under a low pressure. This made the metal removing agent as the evaluation sample E7 made of sulfated products of polyvinyl alcohol.

The first embodiment further produced other evaluation samples E8 and E9 as the metal removing agents made of sulfated products of two types of polyvinyl alcohol which were produced by using different reaction time periods, respectively.

Table 3 further shows the time period of sulfation reaction in the production of the evaluation samples E7, E8, and the comparison sample C3, the functional group density and the average particle size of the evaluation samples E7 and E8 and the comparison sample C3.

Next, the first embodiment produced evaluation samples E9 and E10 and comparison sample C4 as the metal removing agents which contain carboxyl group as anionic functional group by the following method.

That is, 100 ml of sulfuric acid (57 wt. % concentration) was added into 5 g of poly(butadiene acrylonitrile) (manufactured by Wako Pure Chemical Industries, Ltd.), and the resultant mixture solution was heated over 5 hours (reaction time period) in order to reflux it.

Next, the resultant mixture solution was washed three times by using 100 ml of pure water, and then dried at room temperature under low pressure in order to produce the evaluation sample E9 as the metal removing agent made of carboxyl compound of poly(butadiene acrylonitrile).

Next, the first embodiment produced the evaluation sample E10 and the comparison sample C4 having different functional group densities of poly(butadiene acrylonitrile, by using another reaction time period which is different from that of the sample E9.

Table 3 also shows the reaction time period of each of the evaluation samples E9, E10, and the comparison sample C4, the functional group density and average particle size of the evaluation samples E9, E10, and the comparison sample C4.

Next, the first embodiment further produced evaluation samples E11, E12, and comparison sample C5 as the metal removing agents which contain thiol group as the anionic functional group by the following method.

First, 10 g of sodium hydrosulfide (70 wt. % concentration, manufactured by Junsei Chemical Co., Ltd.) and 20 g of pure water were mixed together. Next, 2 g of polyvinyl chloride (manufactured by Wako Pure Chemical Industries, Ltd.) was then added into the resultant mixture solution while mixing the mixture solution at temperature of 50° C. over five hours (reaction time period).

Next, the resultant mixture solution was washed three times by using 100 ml of pure water, and dried at room temperature under low pressure in order to produce the evaluation sample E11 of the metal removing agent made of thiol compound of polyethylene.

Next, the first embodiment then produced the evaluation sample E12 and the comparison sample C5 made of two types of thiol compounds having a different functional group density by using another reaction time period which is different from that of the evaluation sample E11.

Table 3 further shows the reaction time period of each of the evaluation samples E11, E12, and C5, and the functional group density and average particle size of the evaluation samples E11 and E12, and the comparison sample C5.

Next, the first embodiment further produced the evaluation samples E13 and E14, and the comparison sample C5 as the metal removing agent which contain sulfonate acid group as the anionate functional group by the following method.

First, 5 g of poly(styrene-divinyl benzene) (100-200 meshes, manufactured by Wako Pure Chemical Industries, Ltd.) was added into 100 ml of chloroform, and 30 ml of chloromethylmethyl ether (manufactured by Tokyo Chemical Industry Co., Ltd) and 0.3 g of aluminum chloride manufactured by Tokyo Chemical Industry Co., Ltd.) were further added to the mixture solution. The resultant mixture solution was mixed at 0° C. over six hours (reaction time period) to produce chloromethylated polystyrene.

50 ml of phosphorus trichloride (manufactured by Sigma-Aldrich Corporation) and 20 g of aluminum chloride were added into 5 g of chloromethylated polystyrene in order to react them at 80° C. for six hours.

Solid component was extracted from the mixture solution, then dipped into 100 ml of sodium hydroxide solution of 2 mol/l concentration, and finally washed three times by pure water. The solid was then dipped into nitric acid (manufactured by Tokyo Chemical Industry Co., Ltd.) in order to be oxidized and to produce the evaluation sample E13 as the metal removing agent made of phosphonated products of poly(styrene-divinyl benzene).

Next, the first embodiment produced the evaluation sample E14 and the comparison sample C6 made of two types of phosphonated products of poly(styrene-divinyl benzene) having a different functional group density by using another reaction time period which is different from that of the sample E13.

Table 3 shows the reaction time period of each of the evaluation samples E13 and E14, and the comparison sample C6, the functional group density and average particle size of evaluation samples E13 and E14, and the comparison sample C6.

Next, the first embodiment evaluated the function of each of the evaluation samples E1 to E14 and the comparison samples C1 to C6 to remove metal clusters from fuel First, two types of fuel, Fuel A and Fuel B were prepared. Fuel A was produced by the following method.

500 mg of naphthenic acid (manufactured by Tokyo Chemical Industry Co., Ltd.) was solved into 1 kg of light oil (as JIS No. 2 by Japanese Industrial Standards Committee). The mixture oil was filtered by using a filter having porous (or average porous size) of 0.1 μm in order to remove metal powder contained in the light oil.

Next, the total metal concentration of Fuel A was detected by ICP-MS (ICP-MS7000 Series manufactured by Agilent Technologies. Ltd.).

Fuel A was then diluted by using light oil of JIS No. 2 in order to have total metal concentration of approximately 2 ppm.

Table 2 shows the total metal concentration of Fuel A after completion of adjusting the concentration of fuel.

The operational condition of ICP-MS was as follows:
Plasma conditions: RF power of 1600 kW,
Carrier gas: 0.5 L/min,
Reaction gas: present
Nebulizer temperature: 5° C., and
Solvent: xylene.

Fuel B was produced by the following method.

500 mg of zinc neodecanoate (manufactured by Wako Pure Chemical Industries, Ltd.) was solved in 1 kg of light oil (as JIS No. 2 by Japanese Industrial Standards Committee). The mixture oil was filtered by using a filter having porous of 0.1 μm in order to remove metal powder contained in the light oil.

Next, the total metal concentration of Fuel B was detected by ICP-MS series (ICP-MS7000 Series manufactured by Agilent Technologies. Ltd.).

Fuel B was then diluted by using light oil of JIS No. 2 in order to have total metal concentration of approximately 2 ppm.

Table 2 shows the total metal concentration of Fuel B after completion of adjusting the concentration of fuel.

Like preparing Fuel A previously described, the operational condition of ICP-MS was as follows:
Plasma conditions: RF power of 1600 kW,
Carrier gas: 0.5 L/min,
Reaction gas: present
Nebulizer temperature: 5° C., and
Solvent: xylene.

Next, the metal ion concentration of each of Fuel A and Fuel B was detected by using ion chromatography.

Specifically, each of Fuel A and Fuel B, and pure water were mixed with a volume ratio of 1:10 (fuel: pure water), shaken for one minute, and was left to stand for one day. This extracts metal ion into the water phase from the fuel.

Next, the concentration of metal ion contained in the extracted water phase was detected by using ion chromatography device HIC-NS (manufactured by Shimadzu Corporation). The operational condition of ion chromatography device was as follows:
Used column: Shin-Pacs IC-C4,
Solvent: oxalic acid of 2.5 mM,
Flow rate of a pump: 1 L/min,
Oven temperature: 40° C.,
Analyzing time period: 23 min, and
Amount of sample: 50 μL.

The metal cluster concentration was calculated by subtracting the detected metal ion concentration from total metal concentration.

Table 2 shows the metal ion concentration and the metal cluster concentration in Fuel A and Fuel B.

TABLE 2

| Fuel | Seed of metal | Total metal concentration (ppm) | Metal ion concentration (ppm) | Metal cluster concentration (ppm) |
|---|---|---|---|---|
| A | Na | 2.0 | 0.6 | 1.4 |
| B | Zn | 1.9 | 0.4 | 1.6 |

Next, each of the evaluation samples E1 to E14, and the comparison samples C1 to C6 was dried at 1oot over four hours, and then set in a column made of glass (SPC chromatography column whose inner diameter φ is 15 mm).

Next, Fuel A of 100 ml was supplied to the column, and the concentration of metal ion (Na ion) contained in fuel which flowed from the column was detected by the ion chromatography. The metal clusters were calculated based on the detected concentration of metal ion.

The rate (%) of removing metal ion and the ratio (%) of removing metal clusters were calculated on the basis of the metal ion concentration and the metal cluster concentration of Fuel A before flowing into the column (see Table 2), and the metal ion concentration and the metal cluster concentration of Fuel A after flowing from the column. Table 3 shows the calculation results.

In the above calculation, the rate A of removing metal ion (metal cluster) can be calculated by the following formula:

$$A=(B-C)/B\times100,$$

where B is the concentration of metal ion (metal cluster) in fuel before flowing into the column), and C is the concentration of metal ion (metal clusters) contained in Fuel After flowing from the column.

TABLE 3

| Sample No. | Reaction time period (hour) | Anionic functional group | Functional group density (mmol/ml) | Average particle size (μm) | Metal removal rate (%) | | | |
|---|---|---|---|---|---|---|---|---|
| | | | | | Na cluster | Na ion | Zn cluster | Zn ion |
| E1 | 1 | Sulfonate group | 3.4 | 140 | 55 | 23 | 60 | 50 |
| E2 | 2 | Sulfonate group | 6.3 | 141 | 65 | 48 | 76 | 73 |
| E3 | 3 | Sulfonate group | 8.2 | 155 | 76 | 48 | 84 | 75 |
| E4 | 3.5 | Sulfonate group | 9.1 | 187 | 86 | 70 | 94 | 78 |
| E5 | 4 | Sulfonate group | 12.5 | 190 | 92 | 73 | 98 | 85 |
| E6 | 6.5 | Sulfonate group | 20.3 | 224 | 97 | 82 | 99 | 88 |
| E7 | 4 | Sulfate group | 4.6 | 121 | 69 | 47 | 70 | 55 |
| E8 | 24 | Sulfate group | 21.7 | 134 | 88 | 68 | 94 | 73 |
| E9 | 5 | Carboxyl group | 8.5 | 248 | 68 | 40 | 78 | 75 |
| E10 | 7 | Carboxyl group | 10.2 | 282 | 81 | 53 | 88 | 80 |
| E11 | 5 | Thiol group | 7.5 | 173 | 63 | 43 | 76 | 70 |
| E12 | 6 | Thiol group | 8.6 | 177 | 81 | 58 | 89 | 75 |
| E13 | 6 | Phosphonate group | 8.6 | 158 | 62 | 47 | 77 | 45 |
| E14 | 8 | Phosphonate group | 9.8 | 172 | 81 | 53 | 88 | 70 |
| C1 | 1/3 | Sulfonate group | 1.1 | 136 | 27 | 53 | 28 | 58 |
| C2 | 8 | Sulfonate group | 27.3 | 239 | — | — | — | — |
| C3 | 1 | Sulfate group | 1.3 | 89 | 26 | 42 | 37 | 53 |
| C4 | 1 | Carboxyl group | 1.6 | 209 | 12 | 20 | 21 | 20 |
| C5 | 1/2 | Thiol group | 1.5 | 167 | 9 | 18 | 23 | 55 |
| C6 | 1/2 | Phosphonate group | 0.3 | 131 | 6 | 12 | 9 | 28 |

As can be understood from Table 3, it is possible for the evaluation samples E1 to E14 having the functional agent density within the range of 2 to 25 mmol/ml as the metal removing agent to adequately remove metal clusters contained in fuel in addition to metal ions also contained in the fuel.

On the other hand, although the comparison samples C1, C3, C4, C5, and C6 relatively has a good capability of removing metal ions, those comparison samples C1, C3, C4, C5, and C6 has not the capability of adequately removing metal clusters contained in fuel.

It was impossible to evaluate the comparison sample C2 in the function for removing metal clusters and metal ions contained in fuel because the sulfonate group was degraded and dissolved in fuel. This, namely, degrading or decomposing and dissolving the sulfonate group into fuel can be understood from the evaluation experiment using ion chromatography.

As described above in detail, according to the first embodiment of the present invention, it is possible for the metal removing agents (the evaluation samples E1 to E14) having the functional agent density within the range of 2 to 25 mmol/ml to have a superior function for removing metal clusters contained in fuel.

Second Embodiment

A description will be given of the metal removing filter according to the second embodiment of the present invention with reference to FIG. 1.

FIG. 1 is a view showing a structure of the metal removing filter 1 having the metal removing agent according to the second embodiment of the present invention.

As shown in FIG. 1, the metal removing filter 1 has a container 2 of an approximately cylindrical shape and the metal removing agent 3. The metal removing agent 3 is one of the evaluation samples E1 to E14 according to the first embodiment and has the functional agent density (or concentration) within the range of 2 to 25 mmol/ml capable of removing metal clusters contained in fuel with high efficiency.

The container 2 accommodates the metal removing agent 3. The metal removing filter 1 further has a fuel element 5. As shown in FIG. 1, the fuel element 5 is placed in the container 2 so that the fuel element 5 and the metal removing agent 3 are stacked. That is, the space between a pair of meshes 41 and 42 is filled with the metal removing agent 3.

The container 2 having an approximately cylindrical shape has a fuel inlet part 61 and a fuel outlet part 62. The fuel inlet part 61 and a fuel outlet part 62 are formed at both ends of the metal removing filter 1. That is, as shown in FIG. 1, the fuel inlet part 61 is formed at the bottom part of the container 2 in vertical direction, namely, the longitudinal direction of the metal removing filter 1 when the metal removing filter 1 is placed on work.

The metal removing agent 3 can be selected from one of the evaluation samples E1 to E14 according to the first embodiment.

As shown in FIG. 1, fuel is introduced into the container 2 through the fuel inlet part 61, and passes through the mesh 41 and the metal removing agent 3. The fuel then passes through the mesh 42 and the fuel element 5, and flows out to the outside of the metal removing filter 1 through the fuel outlet part 62.

It is therefore possible for the metal removing filter 1 to remove metal ions and metal clusters contained in the fuel with high efficiency. Further, the fuel element 5 can remove alien substances and metal powder contained in the fuel.

Still further, because the fuel element 5 is placed at the downstream side of the metal removing agent 3, it is possible for the fuel element 5 to remove resin fragments even if the resin of the metal removing agent 3 is broken. This makes it possible to prevent resin fragments from flowing out to the downstream side of the metal removing filter 1.

Still further, because the metal removing agent 3 and the fuel element 5 are placed in the same container 2 of the metal removing filter 1, this makes it possible to decrease the entire size of the metal removing filter 1, and further to reduce the cost of manufacturing the metal removing filter 1.

Still further, because the metal removing agent 3 and the fuel element 5 are assembled together with one body, it is possible to reduce the time to replace the metal removing agent 3 and/or the fuel element 5 with new one.

Specifically, it is possible to replace both the metal removing agent 3 and the fuel element 5 simultaneously by replacing the metal removing filter 1 with new one.

The metal removing filter 1 is formed to allow fuel to flow from the fuel inlet part 61 formed at the bottom side of the metal removing filter 1 to the fuel outlet part 62 formed at the top side along the vertical direction.

Specifically, as shown in FIG. 1, the fuel inlet part 61 is formed in the bottom surface 615 of the metal removing filter 1, and the fuel outlet part 62 is formed in the top surface 625 of the metal removing filter 1 when observed from the vertical direction or the longitudinal direction of the metal removing filter 1 on work. This structure of the metal removing filter 1 according to the second embodiment makes it possible to prevent flow resistance of fuel from being increased by clogging the meshes 41 and 42 with the metal removing agent 3.

Third Embodiment

A description will be given of the metal removing filter 11 according to the third embodiment of the present invention with reference to FIG. 2.

Figure 2:
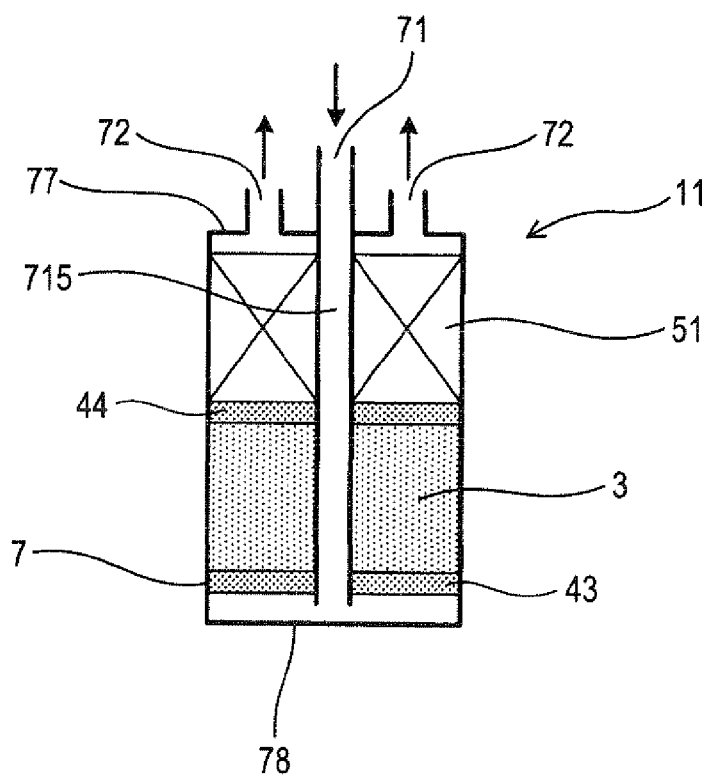
FIG. 2 is a view showing a structure of a metal removing filter according to a third embodiment of the present invention.

FIG. 2 is a view showing a structure of the metal removing filter 11 according to the third embodiment of the present invention.

In the structure of the metal removing filter 11 according to the third embodiment, fuel flows from the top side toward the bottom side of the metal removing filter 11 through the fuel passage 715 along the vertical direction (or longitudinal direction of a metal removing filter 11 when placed on work).

As shown in FIG. 2, like the structure of the metal removing filter 1 according to the second embodiment shown in FIG. 1, the metal removing filter 11 according to the third embodiment has a container 7, the metal removing agent 3, and a fuel element 51. The container 7 accommodates the metal removing agent 3 and the fuel element 51.

The container 7 has an approximately cylindrical shape like the container 2, a fuel inlet part 71 and a pair of fuel outlet parts 72. The fuel inlet part 71 and the fuel outlet parts 72 are formed in the top surface of the container 7.

The fuel inlet part 71 communicates with the fuel passage 715 of a pipe shape which extends from the top surface toward the bottom surface side (bottom part 78) of the container 7.

The meshes 43 and 44 which are placed at one surface of the fuel element 51 and at both sides of the metal removing agent 3 have a penetration hole. The penetration hole of a doughnut shape (omitted from FIG. 2) is formed at the central part of each of the meshes 43 and 44. Those meshes 43 and 44 are placed in the container 7 through the fuel passage 715.

As shown in FIG. 2, the space between the meshes 43 and 44 is filled with the metal removing agent 3 in the metal removing filter 11, like the structure of the metal removing filter 1 shown in FIG. 1. Other components of the metal removing filter 11 according to the third embodiment have the same of those in the metal removing filter 1 according to the second embodiment.

As shown in FIG. 2, in the metal removing filter 11 according to the third embodiment, fuel is introduced into the inside of the container 7 through the fuel inlet part 71 formed at the central part of the top surface of the container 7, and then passes through the fuel passage 715 to the bottom part of the container 7. The fuel then passes through the metal removing agent 3 through the mesh 43, and then passes into the fuel element 51 through the mesh 44, and is finally discharged to the outside of the metal removing filter 11 through the fuel outlet parts 72.

It is possible for the metal removing filter 11 according to the third embodiment to remove metal ions and metal clusters contained in fuel with high efficiency, and further for the fuel element 51 to remove alien substance, metal powder, etc. contained in the fuel. The metal removing filter 11 according to the third embodiment has the same effects of the metal removing filter 1 according to the second embodiment.

(Features and Effects of the Metal Removing Agent and the Metal Removing Filter According to the Present Invention)

The metal removing agent according to the present invention can be used for eliminating metal clusters contained in fuel. The metal cluster is composed of metal particles and/or metal salts, which are cohesive together, having a particle size within a range of not less than 1 nm and less than 100 nm.

The metal clusters are obtained by the steps described later. Fuel is filtered by using a filter having pores of a pore size of 0.1 μm, and metal components contained in the oil separator are extracted by using water.

That is, metal particles other than metal ions contained in fuel can be separated by using the filter, and the metal ions are extracted by water. Therefore the metal clusters are finally remained (or extracted) as metal clusters in the oil phase.

The metal removing agent is made of resin containing an anionic functional group having a functional group density within a range of 2 to 25 mmol/ml.

When the functional group density of the anionic functional group in the metal removing agent is less than 2 mmol/ml, there is a possibility of not adequately removing metal clusters contained in fuel. On the other hand, when the functional group density of the anionic functional group in the metal removing agent exceeds 25 mmol/ml, there is a possibility of being easily separating anionic functional groups from metal removing agent and of decreasing the function for removing metal clusters from fuel because resin having anionic functional group becomes unstable.

It is therefore preferable for the metal removing agent according to the present invention to have anionic functional group having a functional group density within a range of 2 to 25 mmol/ml, and more preferable for the anionic functional group in the metal removing agent to have a functional group density within a range of 5 to 25 mmol/ml, still further preferable to be in the range of 9 to 25 mmol/ml.

The functional group density indicates the number of anionic functional groups contained per volume of the metal removing agent. For example, it is possible to detect, as ion exchange equivalent, the functional group density of the anionic functional group by performing neutralization titration with alkali solution such as sodium hydroxide solution.

It is preferred that the anionic functional group contained in the metal removing agent is at least one group selected from sulfonate group, carboxyl group, sulfate group, thiol group, phosphate group, phosphonate group, iminodiacetic acid group, and aminophosphate group. This makes it possible to easily adjust the metal removing agent made of resin containing anionic functional group.

Further, it is preferable to select, as the anionic functional group, one or more of sulfonate group, sulfate group, carboxyl group, and phosphonate group. This makes it possible to improve the chemical reaction between the metal removing agent and the metal clusters contained in fuel and thereby possible to adequately remove metal clusters from fuel. It is more preferable to use sulfonate group as the anionic functional group.

The metal removing agent is made of resin having the above anionic functional group where the above anionic functional group combines with synthetic resin. The synthetic resin is selected from one of polystyrene bridged (or crosslinked) with a compound such as divinyl benzene, or chloromethylated polystyrene. It is also possible to use, as the above synthetic resin, polyvinyl alcohol type resin, poly(butadiene acrylonitrile) based resin, or polyethylene based resin.

It is preferred for the metal removing agent to be made of particles having an average particle size within a range of 100 μm to 1000 μm.

When the particle size of the metal removing agent is less than 100 μm, there is a possibility of decreasing the function of removing metal clusters from fuel because a pressure loss of fuel is increased, On the other hand, when the particle size of the metal removing agent exceeds 1000 μm, there is a possibility of decreasing the function of removing metal clusters from fuel because of decreasing the surface area of the metal removing agent in contact with metal clusters. The average particle size of the metal removing agent can be measured by using particle size distribution measuring instruments.

The metal removing agent can be remove metal clusters from fuel such as light oil (diesel fuel), gasoline, and biofuels.

It is preferable that the metal removing agent is used to remove metal cluster from light fuel or biodiesel fuel.

In general, the diesel engine using light oil would often cause the problem to deposit metal components in the gap between the sliding unit and the guide unit in an injector, as previously described. Further, biofuels are richer in metal components when compared with light oil. Accordingly, it is possible for using the metal removing agent according to the present invention to obtain improved effects to remove metal clusters from fuel and to suppress metal components from being deposited to the gap between the sliding unit and the guide unit in an injector of an internal combustion engine.

Next, the present invention provides the embodiment of the metal removing filter composed of the container and the metal removing agent. The container accommodates the metal removing agent.

It is preferable that the container has the mesh members and is filled with the metal removing agent which is placed between the mesh members.

The structure of the metal removing filter composed of the mesh members, the container, and the metal removing agent can prevent the metal removing agent from flowing out of the container.

It is preferable for the metal removing filter to further have the fuel element which is placed at the downstream side of the metal removing agent in the container in the direction along which fuel flows.

The fuel element placed in the metal removing filter having the above structure can remove fragments (broken pieces) of resin even if resin of the metal removing agent is broken. This structure of the metal removing filter can prevent the fragments from flowing out at the downstream side of the metal removing filter in the direction along which fuel flows.

It is possible to use a known fuel element having a filtering function. In general, the fuel element is composed of filter paper.

When the fuel element is placed at the downstream side of the metal removing agent in the metal removing filter, it is possible for the metal removing agent to remove metal clusters contained in fuel, and for the fuel element to remove metal particles contained in the fuel.

It is possible for the metal removing filter to have a structure in which the metal removing agent and the fuel element are placed in the same container, or placed in different containers, respectively.

It is preferable to place the metal removing agent at the upstream side and the fuel element at the downstream side when the metal removing agent and the fuel element are placed in different containers, respectively.

It is more preferable that the metal removing agent and the fuel element are placed in the same container. This structure of the metal removing filter can reduce the entire size of the metal removing filter and to decrease the cost of manufacturing the metal removing filter.

Still further, it is possible to reduce work required to replace the metal removing agent and the fuel element in the metal removing filter because the metal removing agent and the fuel element are packed together in the metal removing filter.

It is preferable that the metal removing filter has the structure in which fuel flows through the metal removing agent from the downstream side to the upstream side of the metal removing filter in the vertical direction on work.

When the metal removing filter has the structure where fuel flows from the upstream side to the downstream side in the vertical direction (longitudinal direction) of the metal removing filter, the metal removing agent is captured by the mesh member placed at the downstream side of the metal removing agent, and a pressure of flowing fuel is thereby increased. Accordingly, the structure of the metal removing filter according to the present invention can suppress the fuel flowing pressure from increasing.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A metal removing agent capable of removing metal clusters from fuel, wherein the metal removing agent is made of resin having anionic functional group of a functional group density within a range of 8 to 25 mmol/ml, wherein the anionic functional group contained in the metal removing agent is at least one selected from the group consisting of sulfonate group, carboxyl group, sulfate group, thiol group, phosphate group, phosphonate group, iminodiacetic acid group, and aminophosphate group, and the metal removing agent is made of particles having an average particle size within a range of 100 μm-1000 μm.

2. The metal removing agent according to claim 1, wherein the fuel is one of light oil and biodiesel fuel, and the metal removing agent is capable of removing metal clusters from the fuel.

* * * * *